(12) United States Patent
Bourne et al.

(10) Patent No.: US 12,312,781 B2
(45) Date of Patent: May 27, 2025

(54) SHOWERHEAD MOUNTING

(71) Applicant: KOHLER MIRA LIMITED, Cheltenham (GB)

(72) Inventors: James Edward Bourne, Cheltenham (GB); Simon Westgate, Cheltenham (GB)

(73) Assignee: Kohler Mira Limited, Cheltenham (GB)

( * ) Notice: Subject to any disclaimer, the term of this patent is extended or adjusted under 35 U.S.C. 154(b) by 41 days.

(21) Appl. No.: 17/885,032

(22) Filed: Aug. 10, 2022

(65) Prior Publication Data
US 2023/0003007 A1 Jan. 5, 2023

Related U.S. Application Data

(63) Continuation of application No. PCT/GB2021/050399, filed on Feb. 18, 2021.

(30) Foreign Application Priority Data

Feb. 20, 2020 (GB) ..................................... 2002374

(51) Int. Cl.
*E03C 1/04* (2006.01)
*F16L 43/00* (2006.01)

(52) U.S. Cl.
CPC .......... *E03C 1/0403* (2013.01); *E03C 1/0408* (2013.01); *F16L 43/001* (2013.01)

(58) Field of Classification Search
CPC ................. E03C 1/0403; E03C 1/0408; E03C 2001/028; E03C 1/042; F16L 5/12; F16L 9/22; F16L 15/02; F16L 43/001; F16L 43/00

See application file for complete search history.

(56) References Cited

U.S. PATENT DOCUMENTS

| | | | | |
|---|---|---|---|---|
| 492,946 | A * | 3/1893 | Ricketts | F16L 43/001 285/298 |
| 3,480,299 | A * | 11/1969 | Henderson | F16L 15/08 411/389 |
| 4,453,749 | A * | 6/1984 | McKinnon | F16L 35/00 285/423 |
| 5,409,066 | A * | 4/1995 | McHugh | F16L 25/08 285/275 |
| 6,464,265 | B1 * | 10/2002 | Mikol | F16L 15/02 285/333 |
| 2007/0241563 | A1 * | 10/2007 | Marks | F16L 5/00 285/390 |
| 2012/0255114 | A1 | 10/2012 | Reeves et al. | |
| 2013/0248017 | A1 | 9/2013 | Neagoe | |
| 2016/0074884 | A1 | 3/2016 | Short | |
| 2020/0003347 | A1 | 1/2020 | Ball | |
| 2021/0016301 | A1 * | 1/2021 | Cipriani | B05B 15/62 |

\* cited by examiner

*Primary Examiner* — Reinaldo Sanchez-Medina
(74) *Attorney, Agent, or Firm* — Husch Blackwell LLP

(57) ABSTRACT

A showerhead mounting pipe is provide for mounting a wall-mounted or ceiling-mounted showerhead. The pipe has two ends, and a bend of at least 45° between the ends. Each end of the pipe comprises a connector for a showerhead. The pipe is arranged to be cut at a selected location between the two ends so as to provide a suitable portion for use to mount a showerhead.

18 Claims, 3 Drawing Sheets

SHOWERHEAD MOUNTING

CROSS REFERENCE

This application is a continuation of and claims priority to PCT Application No. PCT/GB2021/050399, filed Feb. 18, 2021, which itself claims priority to Great Britain Patent Application No. 2002374.3, filed Feb. 20, 2020, the entireties of both of which are hereby incorporated by reference.

FIELD OF THE INVENTION

The present invention relates to a showerhead mounting pipe arranged to be used to mount either or both of a wall-mounted showerhead and a ceiling-mounted showerhead. The mounting pipe is arranged to have a showerhead connected thereto at one end of the pipe, and, once suitably prepared, to have a water supply conduit attached to the other end of the pipe.

Embodiments of the invention will now be described in relation to the accompanying drawings, in which.

Figure 1:
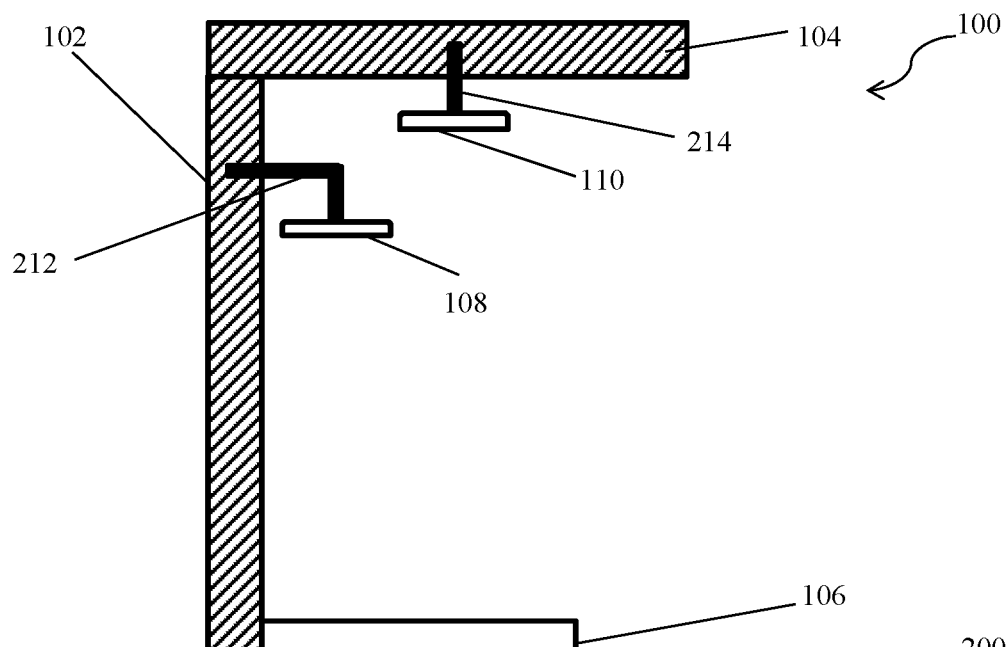
FIG. 1 is a cross-sectional side view of a shower cubicle.

As used herein, the terms "wall-mounted showerhead" and "ceiling-mounted showerhead" refer to fixed location showerheads. Whilst these showerheads may be connected so as to allow some pivoting or rotation of the showerhead, e.g. to change spray angle, the showerheads are mounted in a set position. As opposed to a shower handset connected to a flexible hose and designed to be moved by a user as wished, these showerheads may be referred to as fixed showerheads. As used herein, the term "mounting pipe" therefore denotes an element able to both support the showerhead so as to hold it in a fixed position (i.e. having sufficient rigidity and structural integrity to maintain its shape even when loaded by water pressure), and to convey water to the showerhead. The mounting pipe may or may not be tubular.

According to a first aspect of the invention, there is provided a showerhead mounting pipe for mounting a wall-mounted or ceiling-mounted showerhead, the pipe having two ends, and a bend of at least 45° between the ends, and wherein each end of the pipe comprises a connector for a showerhead.

The pipe is arranged to be cut in two for use, with only one of the connectors being used.

The one remaining connector is used to connect a showerhead to the pipe. The other, cut, end of the pipe is connected to a wall or ceiling supply connection (a supply conduit). The connection to a water supply conduit does not use a connector of the pipe, such as a screw thread. Instead, the connection may be made using welding, or a separate connector. In the prior art, pipes with a connector at each end—e.g. with two threaded ends—are used only in shower installations in which both the showerhead and the supply connection require the pipe to have an integral connector. Such pipes are therefore not arranged to be cut for use, as the cut end would no longer be able to provide the intended function. Further, only one of the two connectors of such a pipe is intended for a showerhead—the other is intended for a supply conduit. A pipe with a showerhead connector at each end is appropriate only when there is an intention to cut the pipe. As used herein, the term "showerhead connector" denotes a connector designed and intended to be connected to a showerhead.

Different users or installers may wish to mount showerheads in different locations, and/or to water supply conduits which are in different locations (e.g. on or within a wall or on or within a ceiling). Two standard mounting arrangements to provide a showerhead fixedly mounted to provide water downwards are: for a ceiling-mounted arrangement, a mounting pipe extending vertically downwards from a ceiling; and for a wall-mounted arrangement, a mounting pipe extending horizontally outward from a wall, and comprising a downward bend.

Manufacturers often do not know the arrangement of a customer's bathroom water supply, and so include in a kit of parts for shower assembly two separate mounting pipes (each with one showerhead connector)—both a straight mounting pipe for use with ceiling-mounted arrangements and a curved, or bent, mounting pipe for use with wall-mounted arrangements. This results in significant wastage, with one of the two mounting pipes almost always being discarded, and also an increased total number of parts for inventory management, warehousing and distribution. Alternatively, extra time and effort must be spent in ascertaining which pipe each consumer wants, increasing the number of different types of kits of parts to manage and the risk of mistakes leaving a customer without a useable mounting pipe.

The inventors appreciated that providing a single, double-ended, mounting pipe that can be cut to size and shape for either mounting arrangement might decrease wastage, as only a smaller portion may be disposed of, and facilitate inventory management, warehousing and distribution, as only a single part is needed for either type of shower installation rather than two. Further, as it is normal for a standard mounting pipe to be cut to the correct length for installation by an installer, the single cut required to provide the suitable portion of the double-ended mounting pipe for use does not significantly add to an installer's workload, if at all.

The pipe may have a total of two ends; i.e. the pipe may not branch. The pipe may have a total of two showerhead connectors.

The pipe may comprise only the one bend. The bend may have a constant curvature.

The pipe may be at least substantially L-shaped.

The bend may have an angle of equal to or around 90°.

The bend may not be placed centrally along the length of the pipe.

The bend may be closer to one connector than to the other connector. For example, the bend may be closer to a first connector of the connectors than a second connector of the connectors, and the first connector may be intended for wall-mounted showerheads and the second connector may be intended for ceiling-mounted showerheads.

The pipe may comprise one or more markers indicating one or more intended cutting positions or regions. For example, the one or more markers may indicate two different intended cutting positions or regions—one for wall-mounted showerheads and the other for ceiling-mounted showerheads. The markers may be integral with the pipe or connected thereto.

Each connector may be or comprise a screw-thread arranged to engagingly receive a screw-thread of a showerhead.

The bend in the pipe may be of at least 60°, at least 70°, at least 80°, or optionally at least 90°. The bend may be between 45° and 90°.

Flexible hoses of the kind used for shower handsets (which are arranged to provide the option of being held and moved manually) are not intended to be covered by the word "pipe" as used herein. The pipe may be rigid.

According to a second aspect of the invention, there is provided a method of installing a mounting pipe for a wall-mounted or ceiling-mounted showerhead. The method comprises: obtaining a pipe comprising a connector for a showerhead at each end and a bend between the connectors; identifying a suitable portion of the pipe for use, the suitable portion including just one connector of the connectors of the pipe; cutting the pipe to separate the suitable portion from the remainder of the pipe; and attaching a cut end region of the suitable portion of the pipe to a water supply conduit, leaving the connector available for connection to the showerhead.

The water supply conduit is arranged not to require the pipe to have an integral connector. For example, it may be designed to have a pipe welded thereto, and/or may comprise, or be arranged to receive, a separate connector arranged to connect the water supply conduit to the pipe.

The pipe may have two ends—a first end and a second end with the pipe extending therebetween. The pipe may also have two connectors—one the first end of the pipe and the other at the second end of the pipe, such that the pipe may therefore be described as a double-ended pipe.

The initial, double ended, mounting pipe is therefore cut into two portions as a part of the installation method—a suitable portion for mounting a showerhead in a chosen location, and a remaining portion, which may or may not itself be suitable for use as a showerhead mounting pipe. The suitable portion may then be itself referred to as a mounting pipe for the relevant showerhead.

The suitable portion may have a length of at least two thirds of the length of the un-cut pipe.

The showerhead to be mounted may be a wall-mounted showerhead. In such examples, the suitable portion may include a length of the pipe including at least a portion of the bend.

The suitable portion may bend through an angle of at least 60°, at least 70°, at least 80°, or optionally at least 90°, between the cut end and the connector.

The suitable portion may or may not include the entirety of the bend in the pipe.

The showerhead to be mounted may instead be a ceiling-mounted showerhead. In such examples, the suitable portion may include a length of the pipe excluding at least the majority of the bend.

The suitable portion may exclude the entirety of the bend in the pipe. The suitable portion may therefore be straight/may bend through an angle of 0° between the cut end and the connector.

Alternatively, the suitable portion may bends through a non-zero angle, for example through an angle of more than 0° but less than 25°, and optionally less than 10°, between the cut end and the connector.

The identifying a suitable portion of the pipe for use may comprise selecting a length for the suitable portion based on wall or ceiling design, supply conduit location, and desired showerhead location. For example, the length may be selected such that the cut end is behind or inside the respective wall or ceiling in use.

According to a third aspect of the invention, there is provided a kit of parts for shower installation. The kit of parts comprises: a showerhead mounting pipe for mounting a wall-mounted or ceiling-mounted showerhead, the pipe having two ends, and a bend of at least 45° between the ends, wherein each end of the pipe comprises a connector for a showerhead; and a showerhead arranged to be connected to one of the connectors of the mounting pipe.

The kit of parts may be provided packaged in a box, e.g. a cardboard box. The box may be marked with instructions (written and/or pictorial) for how use the showerhead mounting pipe.

The showerhead mounting pipe may be as described in the first aspect.

The kit of parts may be used to implement the method of the second aspect.

In the following description, like reference numerals are used for like components. In the following description, references to "horizontal", "vertical", "above", "below", and the likes are intended to refer to the orientation as shown in FIG. 1, i.e. for showerheads mounted in a room or shower cubicle with a horizontal floor and ceiling and one or more vertical walls extending between the two. It will be appreciated that orientations are provided for clarity of description only, and are not intended to be limiting.

FIG. 1 shows a schematic view of a shower cubicle or room 100, comprising a wall 102, a ceiling 104, and a shower tray 106. The shower cubicle 100 includes two showerheads 108, 110; a wall-mounted showerhead 108 and a ceiling-mounted showerhead 110. In alternative embodiments, a shower cubicle 100 may include only one fixed showerhead, or may include more than two fixed showerheads. One or more flexibly-connected showerheads (e.g. on a shower hose) may be provided in addition in various embodiments. The shower tray 106 comprises a drain (not shown) and is arranged to capture water from the showerheads 108, 110. In alternative embodiments, there may be no shower tray—for example, the one or more showerheads 108, 110 may instead be located above a bath tub or within a wet-room or the likes.

In the embodiment shown, both showerheads 108, 110 are mounted such that the face of the showerhead arranged to release water (the spray plate) is horizontal and facing vertically downwards. In other embodiments, one or more showerheads 108, 110 may be differently angled, and/or may be pivotable and/or rotatable such that a shower spray angle can be adjusted.

Figure 2:
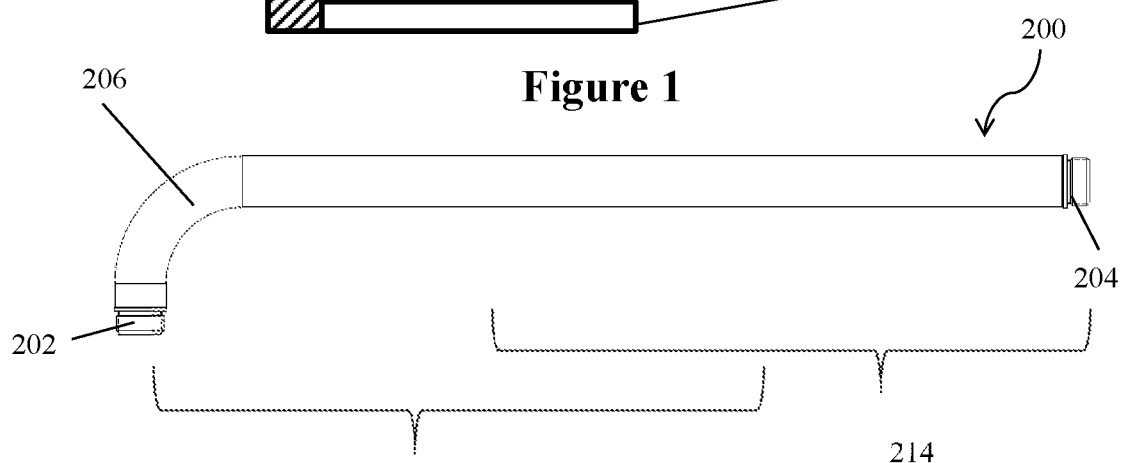
FIG. 2 is a perspective view of a showerhead mounting pipe.

FIG. 2 illustrates a mounting pipe 200 which may be used to provide either or both of a mounting pipe 212 for the wall-mounted showerhead 108 and a mounting pipe 214 for the ceiling-mounted showerhead 110.

In the embodiment shown, the showerheads 108, 110 are substantially disc-shaped, with a water inlet (arranged to be connected to a water supply conduit via a mounting pipe 212, 214) on the upper, rear face, and a spray plate on the lower, front face. In alternative embodiments, the showerheads 108, 110 may be differently shaped—for example with a water inlet perpendicular to the direction of spray from the spray plate rather than parallel thereto. Mounting pipe shape and/or positioning may differ accordingly in such embodiments.

The pipe 200 shown has only two ends/it does not branch. The mounting pipe 200 may be described as a double-ended mounting pipe 200 as it comprises two showerhead connectors 202, 204, one at each end of the pipe 200. The pipe 200 is arranged to be cut into two pieces so as to provide either or both of a mounting pipe 212 for the wall-mounted showerhead 108 and a mounting pipe 214 for the ceiling-mounted showerhead 110. The mounting pipe 200 comprises a bend 206 between the two connectors 202, 204. The bend 206 has a constant curvature in the example shown. In alternative embodiments, curvature may vary around the bend 206. The bend 206 curves through 90° in the example shown. In alternative embodiments, the angle may be different.

The mounting pipe 200 of the embodiment shown has an at least substantially constant internal diameter. The outer diameter may vary, especially in the region of the connectors 202, 204.

The mounting pipe 200 of the embodiment shown is at least substantially circular in cross-section. The cross-sectional shape may differ in other embodiments, for example being square or oval. References to diameter of the pipe 200 may be replaced with references to a width of the pipe 200 in such embodiments.

Figure 6:
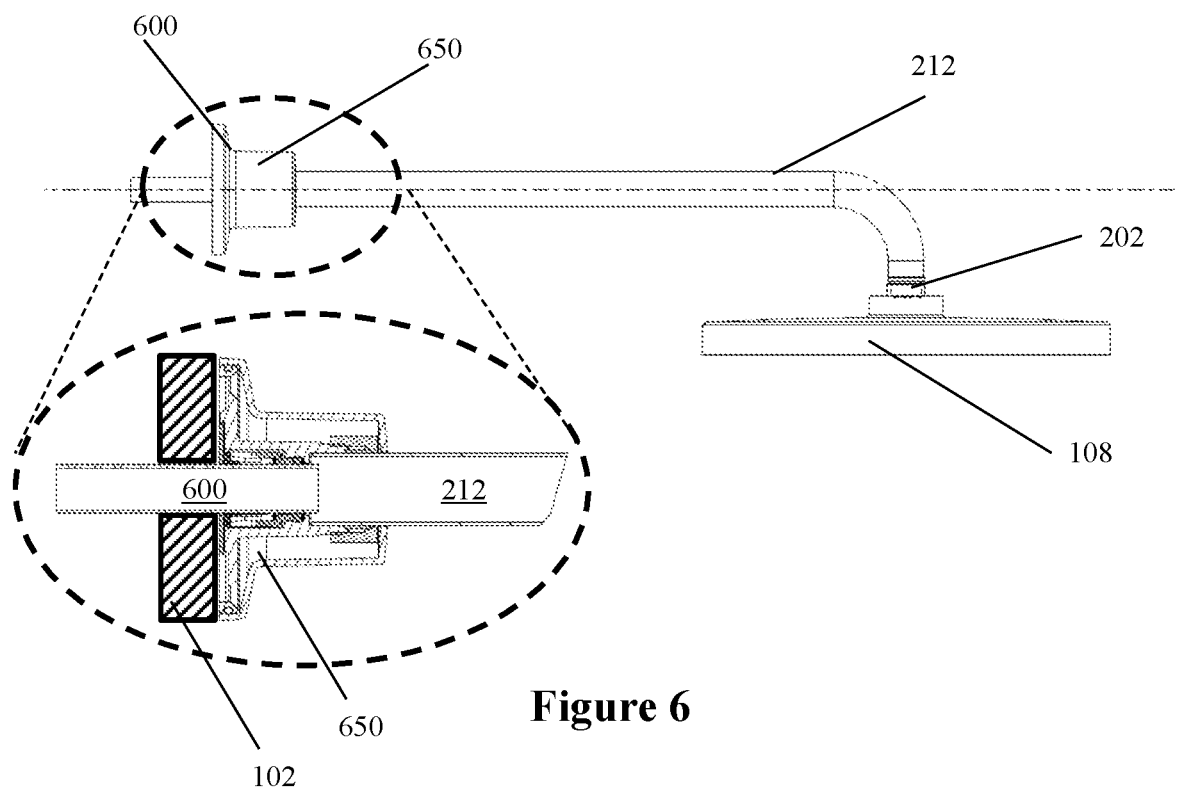
FIG. 6 illustrates side and cross-sectional views of an example wall-mounted showerhead.

In the embodiment shown, the wall-mounted showerhead 108 is connected to a supply conduit within the wall 102 by a mounting pipe 212 formed from a part of the double-ended mounting pipe 200 (conduit not shown in FIG. 1, although a similar conduit 600 is shown in FIG. 6). The mounting pipe 212 extends into the wall 102 in the example shown in FIG. 1, and the connection between the conduit and the mounting pipe may be hidden within the wall (e.g. beneath tiles). The connection between the conduit and the mounting pipe 212 is made without a connector integral with the pipe 212, as the cut end of the pipe 212 is used.

In FIG. 6, the supply conduit 600 extends out of the wall 102, and the connection between the conduit 600 and the mounting pipe 112 is adjacent to the wall.

In alternative embodiments, the supply conduit may not be within the wall 102, and, for example, may instead be within, or extend from, a shower apparatus mounted on the wall, or may be a pipe mounted on the wall surface.

The mounting pipe 212 comprises just one connector 202 ("the first connector") of the two connectors 202, 204 of the double-ended mounting pipe 200.

The connector 202 is on the far side of the bend 206 from the wall 102 when installed as shown in FIG. 1.

In the embodiment shown, the mounting pipe 212 comprises a straight portion 208 extending out of the wall, a bend 206, and a connector 202 for the showerhead 108.

In the embodiment shown, the mounting pipe 212 comprises a second straight portion 207 on the far side of the bend 206 from the first straight portion 208, and between the bend 206 and the connector 202. In the embodiment shown, the second straight portion 208 is much shorter than the first straight portion 207, and also shorter than the bend 206. In alternative embodiments, the second straight portion 207 may be longer, and may even be as long as the first straight portion 207. The connector 202 is located on the second straight portion 207. In the embodiment shown, the connector 202 is a separate component connected to the second straight portion 207. In alternative embodiments, the connector 202 may be formed integrally with the rest of the pipe 212. In some embodiments, the mounting pipe 212 may not comprise a second straight portion, and the connector 202 may be located on the bend 206 itself.

In the embodiment shown, the bend 206 has a total angle of around 90°, such that the pipe outlet (at the connector 202 for the showerhead 108) is at least substantially perpendicular to the pipe inlet (where the pipe 212 joins the supply conduit in use). In alternative embodiments, the angle may be different, and/or there may be multiple bends instead of a single bend in the pipe 212. For example, the pipe 212 may bend through an angle of at least 45°, at least 60°, at least 70°, at least 80°, or optionally at least 90°.

Figure 3:
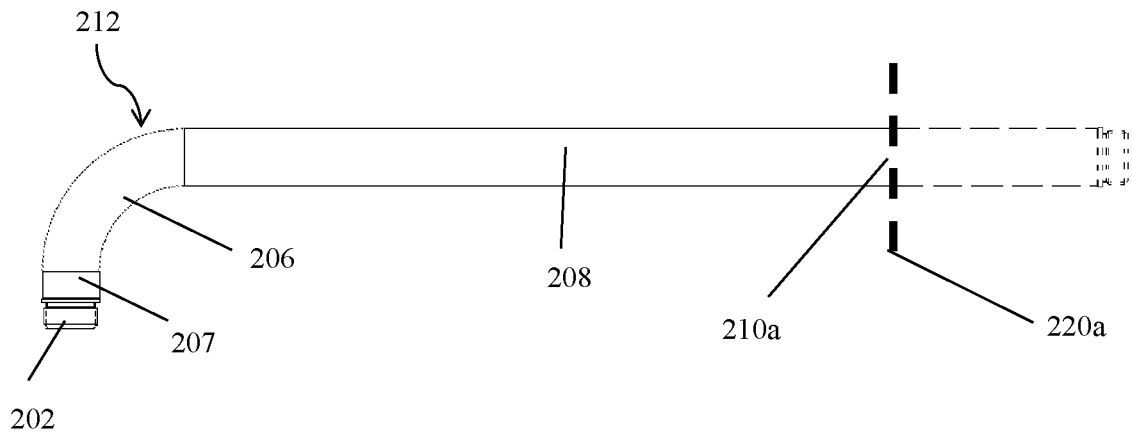
FIG. 3 is a perspective view of an example showerhead mounting pipe.

In the embodiment shown, the entirety of the bend 206 in the double-ended mounting pipe 200 is therefore used to provide the mounting pipe 212 for the wall-mounted showerhead 108. As illustrated in FIG. 3, the pipe 200 is cut at line 220*a*, and a short pipe portion comprising the second connector 204 is discarded. The longer pipe portion 212, which comprises the first connector 202, is deemed suitable for mounting the wall-mounted showerhead 108 and selected for this use. The cut end 210*a* of the pipe 212 is arranged to be connected to the supply conduit, e.g. by welding or using a connector arranged to receive both the supply conduit and the mounting pipe, or by any other suitable technique known to the installer.

As the pipe 200 can be cut to size, a suitable position of the showerhead 108 in terms of spacing from the wall 102 can be selected by the installer. The pipe 200 may be cut closer to the first connector 202 if it is desired to have the showerhead 108 closer to the wall 102, and further from the first connector 202 (so closer to the second, discarded, connector 204) if it is desired to have the showerhead 108 further from the wall 102.

In the embodiment shown, the portion 212 of the pipe 200 selected for use comprises around 50-80%, and optionally around two thirds, of the total length of the pipe 200. The discarded portion is therefore generally smaller than the retained portion.

In the embodiment shown, the first connector 202 is closer to the bend 206 than the second connector 204. In the embodiment shown, the first connector 202 is intended to be used for a wall-mounted showerhead 108 and the second connector 204 is intended to be used for a ceiling-mounted showerhead 110.

In the embodiment shown in FIG. 1, the ceiling-mounted showerhead 110 is connected to a supply conduit (not shown) within the ceiling 104 by a mounting pipe 214 formed from a part of the double-ended mounting pipe 200. In alternative embodiments, the supply conduit may not be within the ceiling 104, and, for example, may instead be mounted on the ceiling surface. The mounting pipe 214 extends into the ceiling 104 in the example shown in FIG. 1, and the connection between the conduit and the mounting pipe may be hidden within the ceiling 104. In alternative embodiments, the supply conduit may extend out of the ceiling 104 and the connection may be below the ceiling.

The mounting pipe 214 comprises just one connector 204 ("the second connector") of the two connectors 202, 204 of the double-ended mounting pipe 200.

Figure 4:
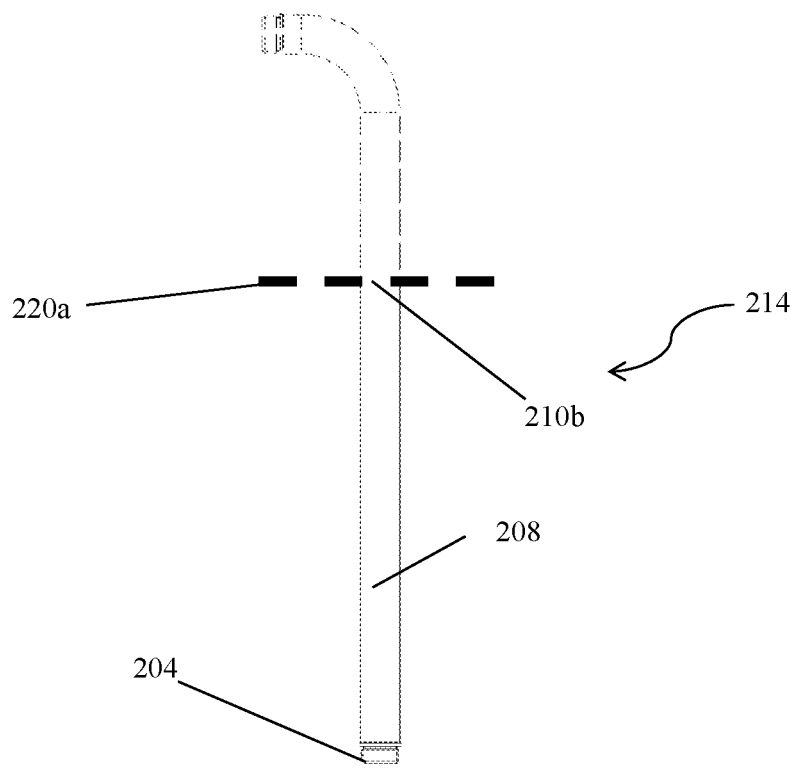
FIG. 4 is a perspective view of an example showerhead mounting pipe.

In the embodiment shown, the mounting pipe 214 comprises a straight portion 208 extending out of the ceiling 104, and a connector 204 for the showerhead 110. The connector 204 is on the straight portion 208 (either integral therewith or connected thereto). No bend is present in the mounting pipe 214—it is straight. The entirety of the bend 206 is discarded, as shown in FIG. 4, in this embodiment. In alterative embodiments, some or all of the bend 206 may be included in the mounting pipe 214 for the ceiling-mounted showerhead 110. In such embodiments, the showerhead 110 may be differently angled, instead of being horizontal, or a supply conduit (not shown) may be differently angled relative to the pipe 214, so using a bend 206 in the pipe 214 to provide a horizontal showerhead. In various embodiments, the pipe 214 may bend through an angle of less than 25° or less than 10°, between the cut end 210*b* and the connector 204. In other embodiments, the showerhead 110 may be differently shaped, for example with a water inlet perpendicular to a spray direction—in such cases, a larger bend angle, such as 90°, may be used.

In the embodiment shown, the connector 204 is initially formed as a separate component connected to the straight portion 208. In the embodiment shown, the connector 204 is permanently connected to the rest of the pipe, e.g. by welding, so as to become an integral part of the finished pipe which is then supplied to a user. In alternative embodiments, the connector 204 may be manufactured integrally with the rest of the pipe 214.

As illustrated in FIG. 4, the pipe 200 is cut at line 220b, and a pipe portion comprising the first connector 202 is discarded. The longer pipe portion 214, which comprises the second connector 204, is deemed suitable for mounting the ceiling-mounted showerhead 110 and selected for this use. The cut end 210b of the pipe 214 is arranged to be connected to the supply conduit, e.g. by welding, or using a connector arranged to receive both the supply conduit and the mounting pipe, or by any other suitable technique known to the installer.

In the embodiment shown, the portion 214 of the pipe 200 selected for use comprises around 50-80%, and optionally around two thirds, of the total length of the pipe 200. The discarded portion is therefore generally smaller.

As the pipe 200 can be cut to size, a suitable position of the showerhead 110 in terms of spacing from the ceiling 104 can be selected by the installer. The pipe 200 may be cut closer to the second connector 204 if it is desired to have the showerhead 110 closer to the ceiling 104, and further from the second connector 204 (so closer to the discarded first connector 202) if it is desired to have the showerhead 110 further from the ceiling 104 (or if e.g. the supply conduit is further away).

In the examples shown in FIGS. 3 and 4, the pipe 200 is intended for use in mounting a single showerhead 108, 110 only—the selected, suitable portion is longer than the discarded portion, i.e. over half of the length of the pipe 200, in each case (cut lines 220a and 220b are not in the same place). The discarded portion may be too short for use in mounting a second showerhead. Keeping the length of a discarded portion short may reduce wastage for single showerhead installations. In some cases, the short, discarded, portion may be long enough to be suitable for use with a second showerhead. In alternative embodiments, for example embodiments in which it is intended to install both a wall-mounted showerhead 108 and a ceiling-mounted showerhead 110 with the same double-ended pipe 200, the pipe 200 may be made longer, and may be symmetrical with the bend 206 centrally located, and the cut off portion may be used for the second showerhead (in some cases with a second cut to shorten the cut-off portion). FIGS. 3 and 4 each show the pipe 200 in the orientation intended for the selected portion in use, as can be seen by comparison to FIG. 1.

In the embodiment shown, the pipe 200 has a total length of between 300 mm and 700 mm, and optionally of around 575 mm.

In the embodiment shown, the shorter straight portion 207 of the pipe 200, between the bend 206 and the first connector 202, is between 30 mm and 80 mm in length, and more specifically around 65 mm long. In alternative embodiments, this pipe section 208 may be longer or shorter.

In the embodiment shown, the longer straight portion 208 of the pipe 200, between the bend 206 and the second connector 204, is between 350 mm and 500 mm in length, and more specifically around 410 mm long. In alternative embodiments, this pipe section 208 may be longer or shorter.

In some embodiments, straight sections 207 and 208 may be the same length. In other embodiments, the pipe 200 may have only one straight section 208.

In the embodiment shown, the pipe 200 has a diameter of between 10 mm and 30 mm, and more specifically of around 22 mm. In alternative embodiments, a narrower or wider diameter may be used as suitable for the showerhead 108, 110 to be installed.

In the embodiment shown, the pipe 200 is made of metal, and more specifically of stainless steel. In other embodiments, other metals, or other materials such as plastics, may be used. Optionally, a combination of multiple materials may be used.

In the embodiment shown, the pipe 200 has a first, shorter, straight portion 207 on one side of the bend 206, and a second, longer, straight portion 208 on the other side of the bend 206. The pipe 200 is generally cut at a position 220 along the longer straight portion 208 (i.e. it is normally pipe portion 208 which is cut). The position of the cut 220 may vary depending on installation conditions and desired shower position, for example often being within the range indicated by the overlapping brackets in FIG. 2. The position 220 may be, for example, between 20% and 80% of the way along the longer straight portion 208 from the bend, and optionally between 25% and 75%. In alternative embodiments, the cut 220 may be located elsewhere—for example on the bend 206 itself, or even on the shorter straight portion 207.

In the embodiment shown, the pipe 200 is not marked on its outer surface. However, in other embodiments, one or more markers may be provided on the pipe 200 to indicate one or more suitable cutting positions or regions. The markers may be detachable stickers or the likes attached to the pipe surface, or may be markings on the pipe itself (e.g. one or more coloured lines or shaded regions, or one or more textured lines or textured regions, or one or more engraved or raised lines). The one or more markers may help an installer to identify a suitable place to cut the pipe, and/or may facilitate making a cut of the correct angle (e.g. perpendicular to the pipe length). For example, a first marker may indicate a suitable cutting area for a wall-mounted showerhead 108 and a second marker may indicate a suitable cutting area for a ceiling-mounted showerhead 110.

In the embodiments described above, both connectors 202, 204 are of the same type, as each is designed to receive the same type of showerhead 108, 110.

In the embodiments shown, each connector 202, 204 is a screw-thread, arranged to engagingly receive a showerhead 108, 110 with a corresponding screw thread. More specifically, each connector is a half inch (1.27 cm) British Standard Pipe (BSP) screw thread, so as to accept currently standard showerhead fittings.

In alternative embodiments, a push-fit fitting or the likes may be used instead of a screw-thread 202, 204.

Figure 5:
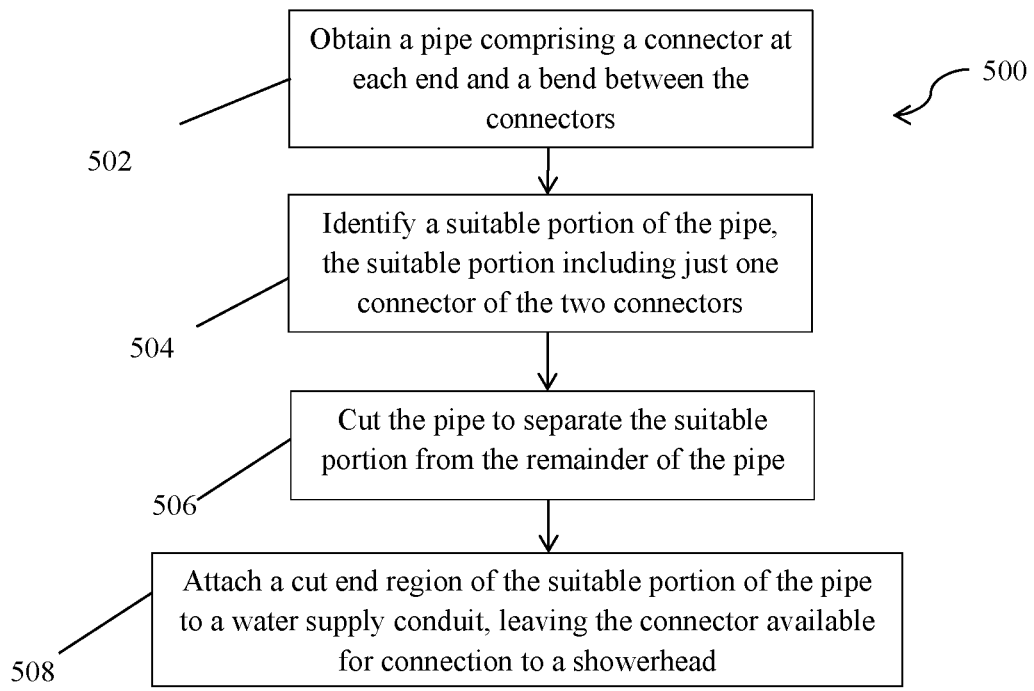
FIG. 5 illustrates a method of using a showerhead mounting pipe to mount either a wall-mounted showerhead or a ceiling-mounted showerhead.

FIG. 5 illustrates a method 500 of using a double-ended mounting pipe 200 to install a wall-mounted or ceiling-mounted showerhead 108, 110.

The method comprises obtaining 502 a pipe 200 having a showerhead connector 202, 204 at each end. The pipe 200 may be as described above and as shown in FIG. 2.

A suitable portion 212, 214 of the pipe 200 for use is then identified 504. The suitable portion includes just one connector 202, 204 of the two connectors of the pipe 200. The suitable portion 212, 214 may be identified by measuring, or otherwise determining, a distance between a water supply conduit outlet and a desired showerhead location. The length of the suitable portion 212, 214 may therefore vary for different installations of the same shower apparatus.

The method 500 further comprises cutting 506 the pipe 200 to separate the suitable portion 212, 214 from the remainder of the pipe. Any suitable pipe-cutting tool may be used for this purpose. The cut 220a, 220b may be perpendicular to the pipe length. In other embodiments, a different angle may be selected, for example based on the intended joining method between the cut end 210a, 210b and the water supply conduit.

The cut end region 210a, 210b of the suitable portion 212, 214 of the pipe 200 is then attached 508 to a water supply conduit. Any suitable technique used in the art may be used to make this connection 508. The connection is arranged to allow water from the supply conduit to flow through the pipe 212, 214 and to a showerhead 108, 110.

The connector 202, 204 at the far end of the pipe 212, 214 from the cut end 210a, 210b remains available for connection to the wall-mounted or ceiling-mounted showerhead 108, 110 (and may already be connected thereto).

The method steps 500 may be performed in a different order.

In some embodiments, the showerhead 108, 110 may be attached to the pipe 200 before it is cut, or to either portion 212, 214 of the cut pipe before it is mounted on the supply conduit. Ordering the steps in this way may make it easier for an installer to gauge by eye the correct position for the showerhead 108, 110, and hence the correct position for the cut 220a, 220b.

In embodiments in which the showerhead 108 to be mounted is a wall-mounted showerhead 108, the suitable portion of the pipe 200, which forms the mounting pipe 212 for the wall-mounted showerhead 108, generally includes a length of the pipe 200 including at least a portion of the bend 206. It may include the entirety of the bend. In the embodiment shown, the suitable portion 212 bends through an angle of 90°. In other embodiments, the suitable portion 212 may bend through an angle of around or at least 60°, 70°, 80°, or 90°, between the cut end and the connector.

In embodiments in which the showerhead 110 to be mounted is a ceiling-mounted showerhead, the suitable portion 214 may include a length of the pipe 200 excluding at least the majority of the bend 206. All of the bend 206 is excluded in the example shown, such that the mounting pipe 214 is straight. In other embodiments, the suitable portion may bend through an angle of less than or equal to 25°, or 10°, between the cut end and the connector.

In embodiments such as that shown in FIG. 1, the method further comprises selecting a length for the suitable portion 212, 214 based on wall or ceiling design, water supply conduit position, and desired showerhead location, such that the cut end 210a, 210b is behind or inside the respective wall or ceiling in use. In alternative embodiments, such as that shown in FIG. 6, the supply conduit 600 may extend out of the wall 102 or ceiling 104, and the cut end 210a, 210b may not be inside the wall. In such embodiments, a connector 650 may be used to enclose and surround the join between the supply conduit 600 and the pipe 212, 214. The connector 650 may itself make or protect the join, or may simply be provided for aesthetic reasons and/or to provide a smooth surface for ease of cleaning.

FIG. 6 shows a close-up cross-sectional view of the connection between the supply conduit 600 and the mounting pipe 212 alongside a side view of the mounted showerhead 108. A connector 650 abuts the wall 102 and encloses a portion of the supply conduit 600 extending out of the wall, and a portion of the mounting pipe 212 where it is connected to the supply conduit 600. Any suitable shape or design of connector 650, or no connector, may be used in other embodiments. For example, in embodiments in which both the pipe 212 and the supply conduit 600 are made of metal (such as stainless steel), welding may be used to join the two.

A kit of parts including a double-ended mounting pipe 200 and a showerhead 108, 110 may be provided. The kit of parts may additionally include an instruction manual for installation, and/or other shower components such as a shower controller, pump, valves and the likes, optionally contained within a casing. In various embodiments, the kit of parts may be provided packaged in a single box or other container. The container may have installation instructions printed thereon or contained therewithin, or may have a scannable QR code or the like, or a web address, arranged to direct a user to installation instructions. The kit of parts may be suitable for both wall-mounted 108 and ceiling-mounted 110 showerheads—a single inventory item may therefore be stored, ordered, advertised, and shipped irrespective of a customer's intended mounting location for a showerhead, A provided instruction manual, and/or printed instructions on a box or other container, may lay out the method 500 as described with respect to FIG. 5. Optionally, a pipe-cutting tool may be included in the kit of parts.

It will be understood that the invention is not limited to the embodiment described herein, and that features may be altered, omitted, or adapted without departing from the scope of the invention. It will also be understood that the invention includes any feature described herein as well as combinations and sub-combinations of any of the features and equivalents thereof.

The invention claimed is:

1. A method comprising:
    obtaining a pipe comprising:
        a first connector for a showerhead at a first end of the pipe, and a second connector for a showerhead at a second end of the pipe, and
        a bend of the pipe between the first end of the pipe and the second end of the pipe;
    identifying a first portion of the pipe, the first portion including one of the first connector and the second connector;
    cutting the pipe to separate the first portion from a second portion of the pipe such that each of the first portion and the second portion includes a first end comprising one of the first connector and the second connector and a second end comprising a plain end of the pipe without any threading or other end treatment,
    wherein the first portion is substantially straight and the second portion includes the bend,
    wherein the first portion is configured to mount a ceiling-mounted showerhead and the second portion is configured to mount a wall-mounted showerhead, and
    wherein the method further comprises the step of at least one of:
        mounting the first portion to a ceiling-mounted showerhead, and
        mounting the second portion to a wall-mounted showerhead.

2. The method of claim 1, wherein the bend is at least a 45° bend.

3. The method of claim 1, wherein the second portion bends through an angle of at least 60°.

4. The method of claim 1, wherein the second portion includes an entirety of the bend in the pipe.

5. The method of claim 1, wherein the showerhead to be mounted is a ceiling-mounted showerhead, and the first portion includes a length of the pipe excluding at least the majority of the bend.

6. The method of claim 5, wherein the first portion bends through an angle of less than 25°.

7. The method of claim 1, comprising selecting a length for the first portion or the second portion based on wall or ceiling design and desired showerhead location, such that the second end of the first portion or the second portion is behind or inside the respective wall or ceiling in use.

8. A showerhead mounting pipe comprising:
- a first end and a second end, the pipe extending therebetween; and
- a bend of at least 45° between the first end and second end,
- wherein the first end comprises a first connector for a showerhead and the second end comprises a second connector for a showerhead,
- wherein the pipe comprises one or more markers indicating one or more intended cutting positions or regions,
- wherein the showerhead mounting pipe can be cut at the one or more intended cutting positions or regions to separate the showerhead mounting pipe into a first portion and a second portion such that each of the first portion and the second portion includes a first end comprising one of the first connector and the second connector and a second end comprising a plain end of pipe without any threading or other end treatment,
- wherein the first portion is substantially straight and the second portion includes the bend, and
- wherein the first portion is configured to mount a ceiling-mounted showerhead and the second portion is configured to mount a wall-mounted showerhead.

9. The showerhead mounting pipe of claim 8, wherein the pipe comprises only the one bend.

10. The showerhead mounting pipe of claim 8, wherein the pipe is at least substantially L-shaped.

11. The showerhead mounting pipe of claim 8, wherein the bend is not placed centrally along a length of the pipe.

12. The showerhead mounting pipe of claim 8, wherein the bend is closer to the first connector than the second connector, wherein the first connector is configured for wall-mounted showerheads and the second connector is configured for ceiling-mounted showerheads.

13. The showerhead mounting pipe of claim 8, wherein the first connector and the second connector comprise a screw-thread configured to engagingly receive a screw-thread of a showerhead.

14. The showerhead mounting pipe of claim 8, wherein the bend is of at least 60°.

15. The showerhead mounting pipe of claim 8, wherein the pipe is rigid.

16. A kit of parts for shower installation comprising:
- a showerhead mounting pipe for mounting a wall-mounted or ceiling-mounted showerhead, the pipe having:
  - a first end and a second end, and
  - a bend of at least 45° between the first end and the second end,
  - wherein the first end comprises a first connector for a showerhead and the second end comprises a second connector for a showerhead,
  - wherein the pipe comprises one or more markers indicating one or more intended cutting positions or regions,
  - wherein the showerhead mounting pipe can be cut at the one or more intended cutting positions or regions to separate the showerhead mounting pipe into a first portion and a second portion such that each of the first portion and the second portion includes a first end comprising one of the first connector and the second connector and a second end comprising a plain end of pipe without any threading or other end treatment, wherein the first portion is substantially straight and the second portion includes the bend, and
  - wherein the first portion is configured to mount a ceiling-mounted showerhead and the second portion is configured to mount a wall-mounted showerhead; and
- a showerhead configured to be connected to the first connector or the second connector.

17. The kit of claim 16, wherein the bend is closer to the first connector than the second connector, wherein the first connector is configured for wall-mounted showerheads and the second connector is configured for ceiling-mounted showerheads.

18. The method of claim 16, wherein the one or more intended cutting positions define the at least one of the first portion and the second portion based on wall or ceiling design and desired showerhead location, such that the second end of the first portion and/or the second portion is behind or inside the respective wall or ceiling in use.

* * * * *